United States Patent [19]

De Bruycker

[11] Patent Number: 4,795,509

[45] Date of Patent: Jan. 3, 1989

[54] INDICATOR FOR DIMENSIONALLY-RECOVERABLE SLEEVES

[75] Inventor: Erwin De Bruycker, Linden, Belgium

[73] Assignee: Raychem Corporation, Menlo Park, Calif.

[21] Appl. No.: 27,295

[22] Filed: Mar. 17, 1987

[30] Foreign Application Priority Data

Mar. 19, 1986 [GB] United Kingdom ............... 8606730

[51] Int. Cl.⁴ ............................................. H01B 13/10
[52] U.S. Cl. ........................................ 156/49; 156/52; 156/54; 156/64; 156/86; 174/DIG. 8; 264/230; 264/342 R; 264/345; 428/913; 428/34.9
[58] Field of Search ................ 53/442; 156/49, 52, 156/64, 85, 86, 54; 174/DIG. 8; 264/230, 342 R, 345; 428/36, 913

[56] References Cited

U.S. PATENT DOCUMENTS 4,344,909 8/1982 DeBlauwe ..................... 264/230

FOREIGN PATENT DOCUMENTS 2077059 12/1981 United Kingdom .
2134334 7/1987 United Kingdom .

*Primary Examiner*—Robert A. Dawson
*Attorney, Agent, or Firm*—A. Stephen Zavell; Herbert G. Burkard

[57] ABSTRACT

A wraparound recoverable article comprises longitudinally opposed edge regions which can be brought together to close the article. On recovery of the article a configurational change of or adjacent the closure member can be seen. This can be used as a temperature indicator to show that recovery is complete. Preferably the configurational change is a rotation of the material at the edge regions which results in a white line extending along the length of the closure, and which is not visible before recovery, becoming visible.

15 Claims, 4 Drawing Sheets

INDICATOR FOR DIMENSIONALLY-RECOVERABLE SLEEVES

The present invention relates to means for aiding correct installation of dimensionally-recoverable, particularly heat-shrinkable, sleeves. Such sleeves are of use for environmental protection of substrates such as telecommunications cable splices and other supply lines.

Where environmental protection is required, some barrier, generally to water, moisture vapour, dirt or other contaminants, must be provided around the substrate and sealed to itself or to the substrate. In order to facilitate installation of the article providing the barrier and in order to increase tolerances in manufacture and to reduce inventories it is desirable that the article can be installed over a wide range of sizes or shapes of substrate and then sealed. Dimensionally-recoverable articles are ideal for such applications since they may be supplied in a deformed configuration, installed around the substrate, and then caused to recover into sealing engagement with it.

In general, a dimensionally-recoverable article is an article the dimensional configuration of which may be to change substantially when subjected to a suitable treatment, for example heating.

Usually these articles recover towards an original shape from which they have been previously deformed but the term "recoverable" as used herein also includes an article which adopts a new configuration even if it has not been previously deformed.

In their most common form such articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable article in another stage. In GB No. 2135836 a heat-recoverable composite material is disclosed for use as a telecommunications splice case. The composite material comprises recoverable fibres, generally in the form of a recoverable fabric, and a matrix material that surrounds them. The fabric may be woven from recoverable fibres and then laminated to produce the recoverable composite material.

In the production of heat-recoverable articles, the polymeric material may if desired be cross-linked at any stage in the production of the article that will enhance the desired dimensional recoverability. One manner of producing a heat-recoverable article comprises shaping the polymeric material into the desired form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape. In the case of the recoverable composite referred to above the recoverable fibres and/or the matrix may be cross-linked. The composite material will not in general undergo the shaping operation referred to, instead it will generally be the fibers prior to weaving etc. that are stretched. Cross-linking of the fibres, where provided, is preferably carried out before stretching, although at least some of the stretching may occur prior to cross-linking.

In other articles as described, for example in British Pat. No. 1440524, an elastomeric member such as an outer tubular member is held in a stretched state by a second member, such as an inner tubular member, which, upon heating, weakens and thus allows the elastomeric member to recover.

A heat-recoverable sleeve suitable for enclosing a telecommunications cable splice is disclosed in GB No. 1155470, and such sleeves have become well known in the art particularly under the Raychem trade marks XAGA and VASM, XAGA 1000 being made from a recoverable composite material as mentioned above and known under the Raychem trade mark Rayfort.

These sleeves are of the wraparound type, being initially in generally sheet form and being able to be wrapped around a cable splice or other substrate and maintained in the wrapped around configuration by some closure mechanism. The closure mechanism may comprise specially shaped longitudinal edge portions of the sheet of recoverable material, which shaped edge portions can be brought together (turning the sheet into a sleeve) and secured together by sliding over them a channel generally C-shaped in cross-section. Instead of a channel one or more clamps may be applied over the edge regions, radially with respect to the sleeve. The edge portions which become trapped within the channel or clamps are known in the art as "rails", and will be so referred to in this specification, although no particular shape is thereby implied.

It is preferred that one rail be provided at one longitudinal edge of the wraparound sleeve, but that the other rail be provided set back slightly from the opposing longitudinal edge. The small web of sleeve between the other rail and the extreme edge acts as a flap which bridges the base of the rails when the sleeve is in the wrapped around configuration and can form a seal between them.

Heat-shrinkable sleeves are commonly coated on an internal surface with a sealing material, such as a hot-melt adhesive to form an improved environmental seal around the substrate.

The sleeves are installed by wrapping them around the substrate and heating, generally with a propane torch. Sufficient heat must be applied, and a high enough temperature reached, to cause the sleeve properly to shrink and to cause any hot-melt, or otherwise heat-activatable, adhesive to become activated. It is important, however, that the sleeve is not overheated since the sleeve itself or the underlying substrate may become damaged. Difficulty is often experienced by the installer in deciding when to stop heating, and this difficulty is made worse by the need to supply extra heat in the closure region due to the large mass of material to be heated and the greater distance from the heat source of the adhesive.

The principal aid to correct heating presently used is a thermochromic paint, or otherwise temperature-indicating, which is applied to the outer surface of the sleeve. It changes colour at a temperature slightly above the higher of the recovery temperature of the sleeve and the activation temperature of the adhesive, and when it changes colour the installer should, ideally, stop heating. A problem, however, is that the paint tells only of the outer surface temperature of the sleeve, which may not be predictably related to the bond-line temperature (ie the temperature of the adhesive on the inner surface) since the ambient temperature, sleeve thickness and rate of heating will alter the relationship. Thus, the installer may have to heat some area of the sleeve, such as the rails, a little after the paint has changed colour. This "post heating" is quite common, but the need for it can lead to poor installation.

One solution to this problem is disclosed and claimed in GB No. 2077059 (Raychem). There, a heat-recoverable wrap-around sleeve has a strip of pigmented adhesive which is capable of flowing on the application of heat. The strip is positioned where the sleeve is thickest, for example under the rails, and its appearance at the end of the sleeve indicates that sufficient heat has been applied. Whilst this solution may be helpful, it is not always applicable to a proper judgement of heating along the entire length of a wrap-around sleeve where there is no possibility of external flow of adhesive.

We have now discovered that an extent of movement, generally rotation, of the closure members of the sleeve can give a reliable indication of correct heating if means is provided to render the extent of such movement visible.

Thus, the invention provides a dimensionally-recoverable, preferably heat-recoverable, wrap-around sleeve having a closure member by means of which opposing edge portions of the sleeve can be held together to maintain the sleeve in a wrapped-around configuration, and having means by which an extent of a configurational change of or adjacent the closure member is rendered visible.

Thus, the sleeve may be used to protect a supply line, for example a telecommunications cable splice, by subjecting the sleeve to an agency, such as heat, to an extent indicated by said configurational change.

The configurational change is preferably of the closure member and preferably appears as rotation.

The configuratioal change of the closure member may result, for example, from dimensional-recovery of the closure member itself, and/or from tension within the sleeve generated as the sleeve recovers on to a substrate around which it has been wrapped. These two effects may act in the same way, or they may oppose each other, in which case a net effect will be seen.

The means by which rotation or other configurational change may be rendered visible may comprise a localized colouring of a part of the closure member, or it may comprise a shape of the closure members whose rotational position, for example, is easily recognizable. Prior art closure rails are uniformly coloured and generally rounded in cross-section and hence any rotation thereof, particularly a certain degree of rotation, is not visible.

We prefer that a closure member is provided at opposing edge portions of the sleeve and that the closure members can be held together by a closure channel or clamp. Especially we prefer that each of two opposing edges of the sleeve be provided with a rail and that a channel, substantially C-shaped in cross-section, be provided that may be slid over the parts to hold them together. The channel may have a series of transverse slots spaced along its length through which the rails, and therefore movement of the means for rendering visible, may be seen. Preferably the means comprises a mark, such as a painted or otherwised coloured line, that runs along the length of the rails (it may be a continuous line or a dotted or otherwise broken line) and which is initially hidden from view and which comes into view, such as through the slots, when sufficient heat has been applied. Alternatively the mark may initially be in view and after heating be out of view. Preferably the localised colouring of the closure member comprises a light coloured paint or ink.

Thus, we prefer that the means for rendering comprises a mark, ie localized colouring, that changes between being visible and being invisible to an installer of the sleeve. This gives a more clear indication than a movement of a mark between two visible positions.

The final desired position of the mark (where it becomes or remains visible) may be indicated for example by a mark on the closure channel with which the moving mark should become aligned or to which its position should otherwise be related.

In one embodiment the rails at the edge portions of the sleeve are formed by folding each edge portion around a support, for example a nylon rod. The folding action may comprise folding an edge portion over the rod so that the edge is folded back on itself a short distance, for example from 0.5-5 preferably 1-2.5 cms. The mark may be made on this folded over portion. During heat-recovery of the sleeve the extent of this folded over portion will decrease, because it is recoverable, and the mark will therefore move.

The sleeve may comprise any recoverable material. For example it may comprise a polymeric sheet material. In a preferred embodiment it comprises a recoverable composite material, incorporating a recoverable fabric, recoverable by virtue of recoverable fibres thereof.

The sleeve preferably has a heat-activatable sealing material on an internal surface thereof. Where the sleeve is heat recoverable, the sealing material is preferably activated by the heat applied to effect recovery.

The sleeve preferably has a temperature-indicating composition for example a thermochromic paint on an external surface thereof. This is advantageous, particularly where the sleeve is heat recoverable to indicate when recovery is complete.

The invention is further illustrated by the accompanying drawings, in which.

Figure 1:
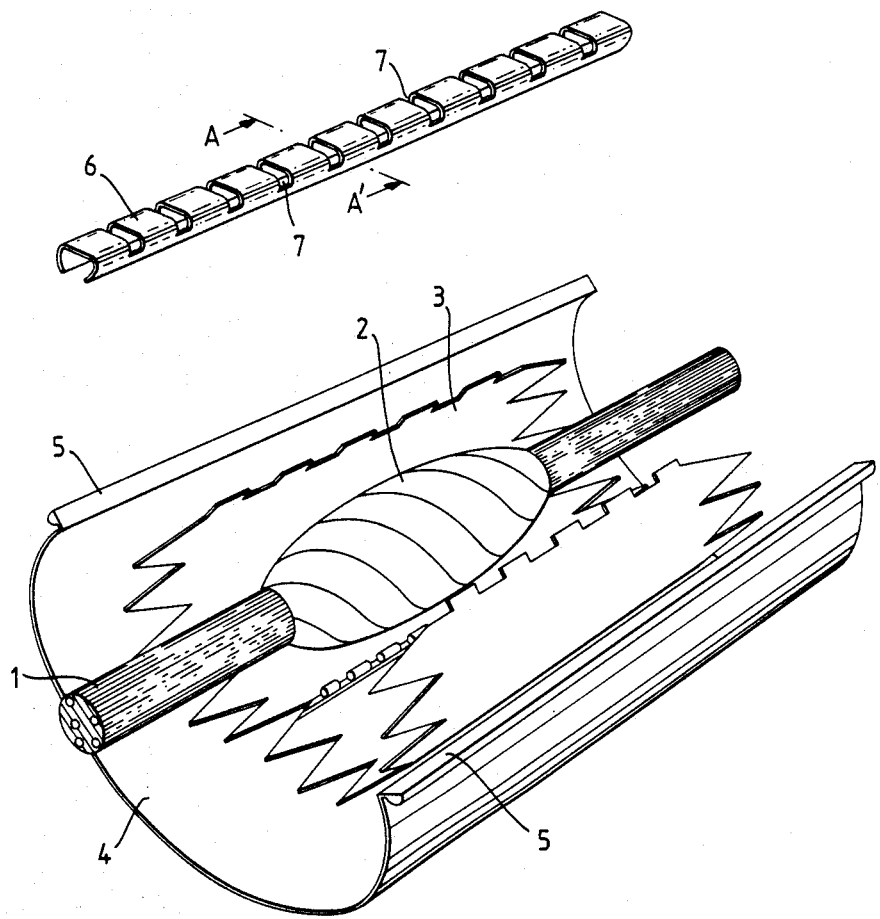
FIG. 1 shows a prior art heat-shrinkable wrap-around sleeve.

FIG. 1 shows two telecommunications cables 1 joined at a splice bundle 2. A liner 3 is shown positioned around the splice bundle 2. The liner comprises two half-shells hinged along one edge, and it is shown before being closed around the bundle 2. Each end of the liner is crown-shaped, the tapering fingers of which allowing a gentle transition to be made from the larger diameter of the splice bundle 2 down to the smaller diameter of the cables 1. The tapering fingers are bent inwards to contact the cables and serve also to locate the liner with respect to the cables. The function of the liner is to provide the splice case that is to be constructed with mechanical strength, and, if it comprises a metal, to act as a water vapour barrier. A heat-shrinkable sleeve 4 is then wrapped around the cable splice bundle 2 and liner 3. The rails 5 are brought together and the channel 6 is slid longitudinally over them. Other means may however be used to hold the rails 5 together, for example a series of clips may be applied over the rails in a direction radial with respect to the sleeve.

The sleeve 4 may be coated on its internal surface with a sealing material such as a hot-melt adhesive, and on its outer-surface with a thermochromic paint or other temperature-indicating composition. The sleeve is then heated, for example with a propane torch or by means of an electrical heater which may be self-contained and may comprise at least part of the sleeve itself. It will shrink down into engagement with the liner 3 and with the cables over a short distance as they emerge from the liner. Thus, an environmental seal is made around the cable splice bundle 2.

Since the sleeve, in this application, is initially cylindrical and must conform to a substrate of non-uniform cross-sectional size, it must not only become smaller but must also change shape. In particular the rails 5, and therefore the channel 6 must be sufficiently flexible to allow them to bend to match the contour of the cables and liner. The flexibility of the channel 6 is increased by means of slots 7 that allow it to bend longitudinally but do not reduce significantly its resistance to opening out.

The present invention, which is illustrated in the subsequent drawings, is particularly applicable to the splice case components illustrated in FIG. 1, although it can be used with other heat-shrinkable articles. For example it may be used in the absence of a liner, where the substrate is cylindrical, and where the sleeve is part of a larger body etc.

Figure 2A:
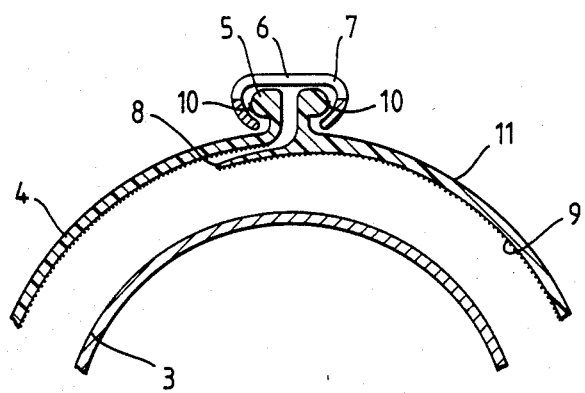
FIGS. 2a and 2b show a first embodiment of invention.
Figure 2B:
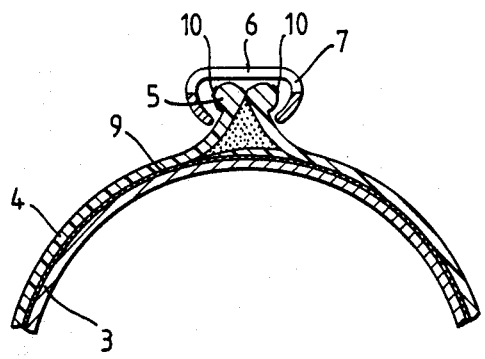

FIGS. 2a and 2b are partial transverse cross-sections through a wrap-around sleeve 4 embodying the invention. FIG. 2a shows the sleeve 4 before heat-recovery and FIG. 2b shows the sleeve after proper recovery into engagement with a liner 3.

Closure members 5 in the form of rails at edge portions of the sleeve are held togethr by a channel 6. The channel 6 is shown as a cross-section at a position such as AA' of FIG. 1, ie through one of the slots 7. The sleeve has an integral or bonded flap 8 to aid formation of a seal between the base of the rails, and an internal surface of the sleeve is coated with a hot-melt or other heat-activatable adhesive 9.

The sleeve 4, in this case at the closure members, is provided with marks 10 preferably running along the entire length of the sleeve, and preferably of a paint or ink or other colourant of contrasting colour with that of the sleeve for example white or silver.

Initially, as shown, the marks 10 may be hidden from view. They are positioned such that they are not visible through the slots 7.

When the sleeve 4 of FIG. 2a is heated it shrinks and the adhesive 9 becomes activated. The sleeve will recover into engagement with the liner 3 or other substrate that it surrounds.

The rails 5 may recover and thereby change their configuration, rendering the marks 10 visible. In the embodiment illustrated, however, tension in the sleeve pulls the rail apart thereby causing them to rotate to the configuration illustrated in FIG. 2b. The marks 10 can now be seen by the installer through the slots 7. The outer surface of the sleeve 4 may be provided with a thermochromic or other temperature indicating composition 11. Such composition will change colour or otherwise alter when the correct outer temperature of the sleeve has been reached, and will give a general indication of correct heating over the majority of the surface area of the sleeve 4. In the area of the rails 5, however, the mass of material to be heated is larger due to the rails and the flap, and also the rails and the flap act as a barrier to heat transfer. Conversion of a thermochromic paint in this region may not therefore give a correct indication of proper heating. The configurational change of the rails 5 will however depend on the temperature not merely of the surface of the sleeve 4, but also on the extent of recovery be it of the rails themselves and/or of the web of the sleeve between them.

A mark 10 may be provided on both the rails or on one only. Furthermore, two or more marks may be provided on one or both of the rails, to indicate different extents of heating. Marks may be provided also on the channel 6 or elsewhere with which the marks 10 should be aligned.

Figure 3A:
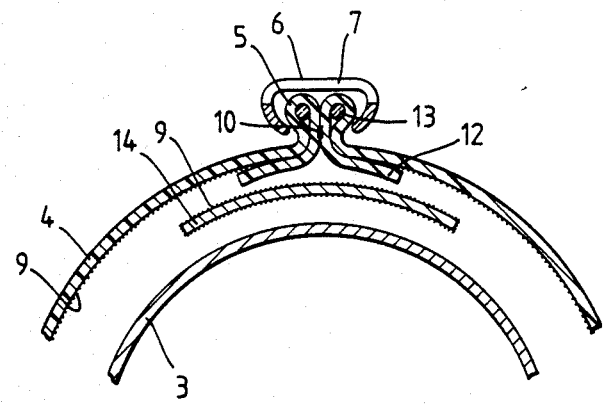
FIGS. 3a and 3b show a second embodiment of the invention.
Figure 3B:
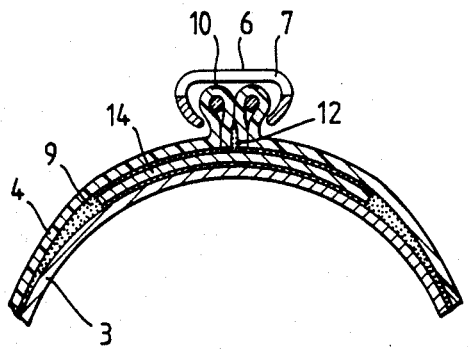

In FIGS. 3a and 3b the closure members are again in the form of rails 5, but here they are formed by folding edges portions 12 of the sleeve 4 around an elongate member 13 such as a nylon rod or a cord. This is a preferred form of closure for a heat-recoverable fabric or composite sleeve. A discrete flap 14 is provided to aid formation of a seal between the rails 5. The edge portions 12 of the sleeve 4 are preferably heat-recoverable, especially heat-shrinkable such that the extent of the fold decreases on recovery. In general, since the ends of the folds are invisible to the installer, this change will not be noticeable unless the means of the invention is employed. If the edge portions are heat-recoverable, their change in configuration will evidently be an indication that they have reached their recovery temperature. This in turn will indicate that the underlying adhesive 9 has or will shortly reach its activation temperature if the adhesive and sleeve have been chosen such that their activation and recovery temperatures are compatible. It may also indicate that the remainder of the sleeve has reached its recovery temperature, depending on the uniformity of heating and recovery temperatures across the sleeve. Thus, the act of heat-recovery precisely at or near the position of interest is used to indicate temperature and extent of heating.

Because of the direction in which the edge portions 12 are wrapped around members 13, the marks 10 may be initially provided on the generally vertical portions of each rail on the positions that face the other rail. In those positions, the marks will be invisible to the installer, as shown in FIG. 3a. The situation after recovery is shown in FIG. 3b, where the sleeve 4 in general, and the edge portions 12 in particular have shrunk. The marks 10 are now visible through the slots 7 in the rails 6.

Figure 4:
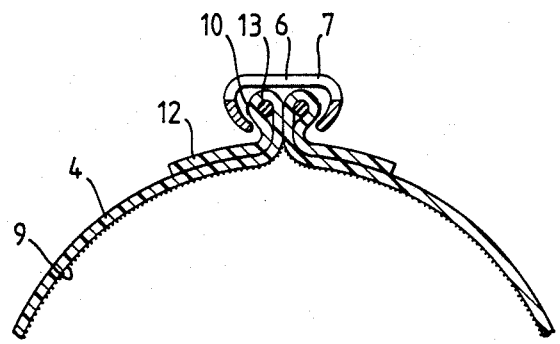
FIG. 4 shows a third embodiment of the invention.

FIG. 4 shows a modification of the sleeve of FIGS. 3a and 3b, where edge portions 12 of the sleeve 4 are wrapped around the members 13 in the opposite direction. Here the configurational change shown in FIGS. 2a and 2b and the recovery shown in FIGS. 3a and 3b, act in the same fashion, ie to move the mark 10 on the left-hand rail 5 in a clockwise direction, and that on the right hand rail in an anticlockwise direction. If desired, one rail 5 can be as shown in FIG. 3a and the other as shown in FIG. 4. Also, one of the edge portions of FIG. 3a may serve as a flap, replacing or additional to the flap 9.

Figure 5:
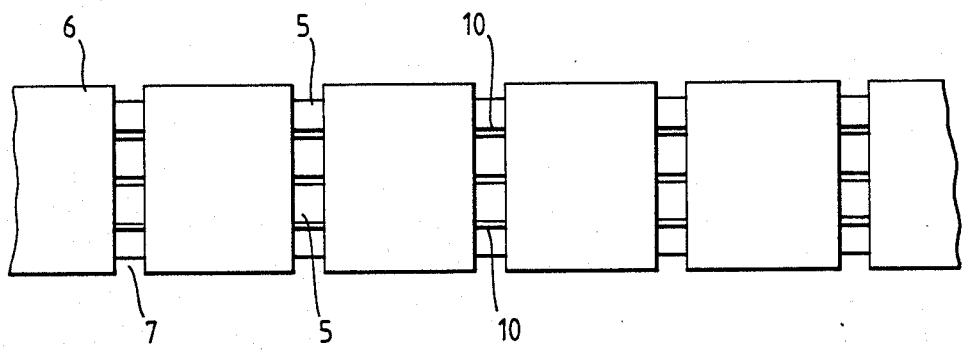
FIG. 5 shows a partial plan view of the type of sleeve of FIG. 3b.

FIG. 5 shows a plan view of the sleeve 4 and closure of FIG. 3b.

For the avoidance of doubt it is here stated that the invention provides a technique for judging correct installation of dimensionally-recoverable sleeves, in particular for judging the correct extent of heat-installation, and that any of the features disclosed herein may be selected. For example, any of the sleeves, closure mechanisms, or temperature indicators may be selected.

I claim:

1. A dimensionally-recoverable wrap-around sleeve having a closure member by means of which opposing edge portions of the sleeve can be held together to maintain the sleeve in a wrapped-around configuration, and having means comprising localized coloring of the closure member by which an extent of a configurational change of the closure member is rendered visible.

2. A sleeve according to claim 1, in which the configurational change appears as rotation.

3. A sleeve according to claim 1, which has a said closure member at opposing edge portions thereof, which closure member can be held together by a closure channel or clamp.

4. A sleeve according to claim 1, in which the closure member comprises dimensionally-recoverable sheet material folded around an elongate member such that the extent of the fold decreases on recovery of the material.

5. A sleeve according to claim 4, in which the folded sheet material comprises edge portions of the sleeve.

6. A sleeve according to claim 1, which comprises a recoverable composite material, recoverable by virtue of recoverable fibres thereof.

7. A sleeve according to claim 1, in which the colouring comprises a light coloured paint or ink.

8. A sleeve according to claim 1, in which the colouring is provided substantially along the length of the closure member.

9. A sleeve according to claim 1, in which the colouring changes position between being visible and being invisible to an installer of the sleeve on said configurational change.

10. A sleeve according to claim 1, which has a said closure member adjacent opposing edge portions thereof, which closure members can be held together by a closure channel or clamp, said means for rendering visible comprising colouring of at least one closure member which before configurational change thereof is localized on a surface thereof that faces the other closure member.

11. A sleeve according to claim 1, having a heat-activatable sealing material on an internal surface thereof.

12. A sleeve according to claim 1, having a temperature-indicating composition on an external surface thereof.

13. A sleeve according to claim 1, in which the sleeve is heat-recoverable and in which said configurational change results from heating.

14. A method of environmentally protecting a supply line, which comprises installing around it a sleeve according to claim 1, securing the sleeve in a wrapped-around configuration, and causing dimensional recovery of the sleeve, the method comprising subjecting the sleeve to an agency to an extent indicated by said configurational change.

15. A method according to claim 14, in which the supply line comprises a telecommunications cable splice.

* * * * *